Patented July 28, 1942

UNITED STATES PATENT OFFICE 2,290,880

ETHERS OF ALCOHOL AMINES

Morris Katzman and Albert K. Epstein, Chicago, Ill., assignors to The Emulsol Corporation, Chicago, Ill., a corporation of Illinois No Drawing. Application April 3, 1939,
Serial No. 265,783

7 Claims. (Cl. 260—584)

This invention relates to new chemical compounds which have particular utility in the arts where interface modifying functions are required.

One of the objects of the invention is the preparation of new chemical compounds having unusual resistance to decomposition in acid and alkali media.

Another object of the invention resides in the preparation of new chemical compounds which are particularly useful in enhancing the emulsification of oleaginous and aqueous materials.

Other objects and features of the invention will become more apparent as the description proceeds.

In general, the compounds of the present invention may be characterized as partial ethers of alcohol tertiary amines in which the radical which unites with the alcohol amine or derivative thereof to produce the ether contains a minimum of eight carbon atoms and particularly from twelve to eighteen carbon atoms. The final ether compounds contain at least one free or unesterified hydroxyl group which is attached to the alcohol tertiary amine radical. In other words, the compounds of the present invention are those which are derived from alcohol tertiary amines in which at least one of the hydroxy groups of the alcohol amine remains in free or unesterified form.

The ethers of the present invention may be prepared in various ways. A particularly satisfactory method of preparation involves the conversion of the alcohol tertiary amine into an alcoholate, for example, an alkali metal alcoholate, and then said alcoholate is reacted with a halide containing a minimum of eight carbon atoms. The reaction results in the production of an alkali metal halogen salt which may be separated from the reaction mixture in any desired manner.

The following specific examples are illustrative of methods which may be employed for preparing the novel ether compounds of the present invention. As previously indicated, other methods may be used, the proportions of reacting ingredients, the times of reaction, the order of steps, and the temperatures may be varied and supplementary processes of purification and the like may be resorted to wherever found desirable or convenient. These and other variations and modifications will be evident to those skilled in the art in the light of the guiding principles which are disclosed herein.

Example I (a) 50 grams of commercial triethanolamine, 8 grams of metallic sodium in thin slices, and 250 grams of dry dioxane were placed in a flask and refluxed for two hours or until substantially all of the sodium had reacted with a hydroxy group of the triethanolamine to produce the alcoholate. The reaction product was then washed twice with 100 cc. portions of dry dioxane to remove unreacted triethanolamine.

To the washed material there were added 60 grams of octyl iodide and 100 grams of dry dioxane and the mass was refluxed for three to four hours or until substantially all of the iodine was found as sodium iodide. The sodium iodide was then filtered off and the dioxane evaporated under vacuum. The resulting product, which was an amber oil, contained a substantial proportion of the compound having the formula:

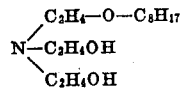

This product, particularly when slightly acidified, showed good foaming and surface tension reducing properties in aqueous media.

(b) Equal parts by weight of the reaction product produced hereinabove and concentrated sulphuric acid were mixed for about ¼ hour at 30 degrees C. to 40 degrees C. The resulting product was then hydrated with crushed ice and neutralized to litmus with sodium hydroxide. It possessed good foaming properties, reduced the surface tension of aqueous media and contained a substantial proportion of the compound having the formula:

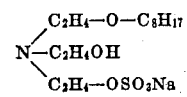

Example II 70 grams of commercial triethanolamine, 10 grams of metallic sodium in thin slices, and 100 grams of a product consisting essentially of the mono chloracetic acid mono ester of coconut oil mono fatty acid mono ester of diethyleneglycol were mixed together and allowed to stand at room temperature for one hour. 100 cc. of dry dioxane were then added and the mass was heated to refluxing temperature and allowed to reflux for at least two hours. It was then cooled and an excess of ether added thereto and the insoluble matter was then filtered off. The ether and dioxane are then evaporated under vacuum and the resulting product, which was a clear amber oil and had good foaming properties, particularly in slightly acid media, contained a substantial proportion of a compound having the formula:

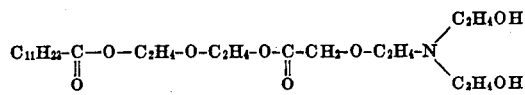

Other examples of products which fall within the scope of the present invention and which may be prepared by methods generally similar to those described hereinabove are listed below:

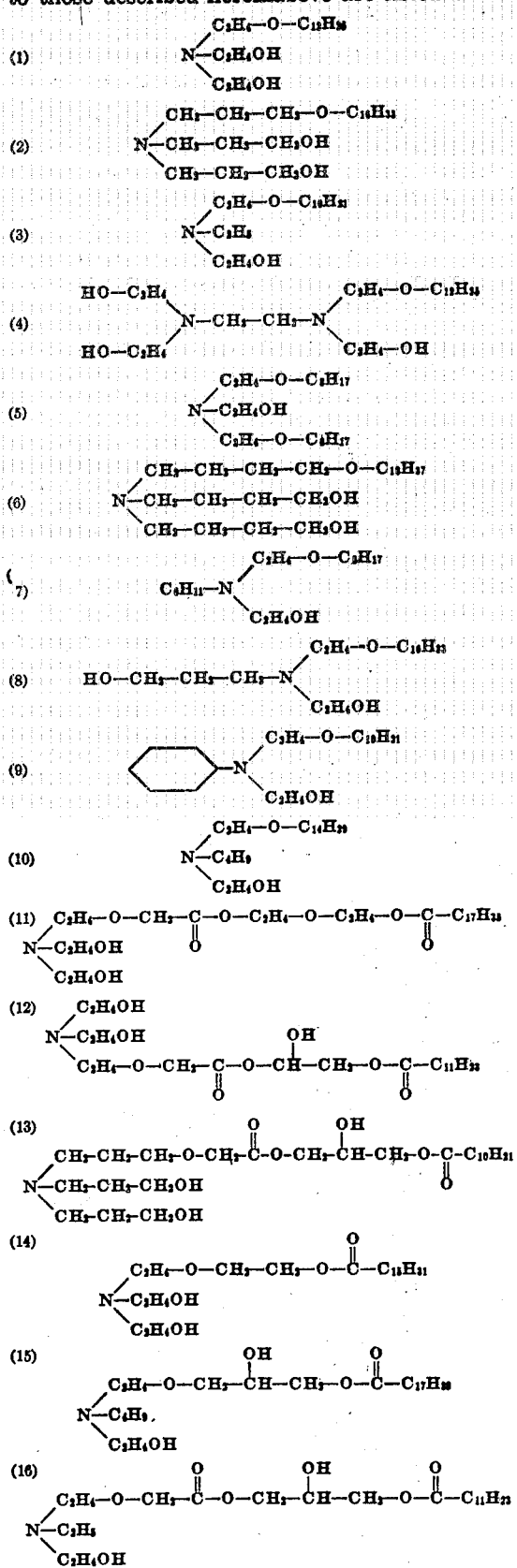

While the above examples represent single substances, it will be understood that, in practice, it is, in general, more advantageous to employ mixtures of any two or more thereof with or without diluents. Indeed, where commercial sources of ingredients are utilized, mixtures of various compounds falling within the scope of the present invention will be produced.

The alcohol tertiary amines from which the ethers of the present invention are prepared may be selected from a large class and include the symmetrical and unsymmetrical, normal and iso derivatives. Among the compounds, mixtures of any two or more of which may be employed, are, for example, triethanolamine and mixtures such as occur in the so-called commercial triethanolamine, monoethyl diethanolamine, tripropanolamine, triisopropanolamine, tributanolamine, trihexanolamine, N-cyclohexyl dibutanolamine, diethanol aniline, monoethyl dipropanolamine, diethanol cyclohexylamine, monobutyl diethanolamine, diethanol methylamine, alkylol tertiary amines of other mono- or polyvalent alcohols such as glycols, glycerol, sugars and sugar alcohols, such as sorbitol; alkylol polyamines, such as alkylol derivatives of ethylene diamine, diethylene triamine and triethylene tetra-amine; arylol amines such as N-phenyl diethanolamine and alkylolamines such as, for example,

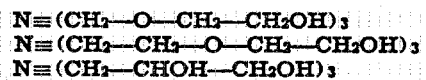

Because of commercial and other considerations, it is preferred to employ triethanolamine and triisopropanolamine.

The radicals containing at least eight carbon atoms and which are ether-linked to the alcohol tertiary amines may also be derived from a large group of chemical compounds. Thus, for example, alcohols which may serve as sources of said radicals are octyl alcohol, nonyl alcohol, decyl alcohol, lauryl alcohol, myristyl alcohol, cetyl alcohol, oleyl alcohol, stearyl alcohol, ricinoleyl alcohol, palmitoleyl alcohol, ceryl alcohol, carnaubyl alcohol, myricyl alcohol, and, in general, the higher molecular weight saturated and unsaturated aliphatic alcohols. I may also employ cyclo-aliphatic or alicyclic alcohols such as the sterols, as, for example, chloesterol, isochloesterol, phytosterol, as well as hydroaromatic alcohols such as abietol. In addition, I may utilize such unsaturated alcohols as linalool, citronellol, gernaiol and the like.

It is, of course, obvious that the alcohols may be prepared in accordance with any desired method. For example, these alcohols may be prepared by the so-called Bouveault and Blanc method, or alternatively, by the reduction or catalytic reduction with hydrogen of natural or hydrogenated animal or vegetable fats and oils in accordance with well known practices. Again, the alcohols may be derived from synthetic processes such as by the oxidation of hydrocarbons or may be prepared by saponification of waxes and the like. Alternatively, they may be prepared by reduction of aldehydes or by the Grignard reaction. Still other methods known in the literature may likewise be employed if desired or deemed expedient. It is likewise apparent that mixtures of the foregoing or other alcohols may be utilized as, for example, the mixture of alcohols resulting from the hydrogenation of coconut oil or the free fatty acids of coconut oil. Lauryl alcohol comprises about 45% of the total alcohol mixture, the remaining alcohols running from $C_6$ to $C_{18}$.

The higher molecular weight organic halides which may be employed for reaction with alkali metal derivatives of the alcohol tertiary amines to produce ethers in accordance with the invention include alkyl chlorides containing at least eight carbon atoms and of the primary, secondary or tertiary type, straight chain or branched chain. Again such halides may be of cyclo-aliphatic, aromatic or aromatic-aliphatic character and they, including those of strictly aliphatic character, may be derived from petroleum hydrocarbons and the like.

The alcohols obtainable by substituting alkyl or acyl radicals, of high molecular weight, in place of the hydrogen of one or more hydroxy groups of polyhydroxy substances or polyhydric alcohols, it being understood that at least one hydroxy group attached to the nucleus of the polyhydroxy substance or polyhydric alcohol remains, are also within the scope of the alcohols from which the compounds of the present invention may be produced. As examples of such alcohols may be mentioned partially esterified or partially etherified mono-, di-, and polysaccharides, and sugar alcohols such as monolauric acid ester of sucrose, monostearic acid ester of dextrose, monopalmitic acid ester of sorbitol, monolauryl ether of pentaerythritol, monolauric acid ester of pentaerythritol, and the like; the monoglycerides and di-glycerides, preferably of the higher fatty acids, including, for example, monolaurin, monomyristin, monostearin, mono-olein, distearin, diolein, dicaproin; mono-lauryl ether of glycerol, mono-oleyl ether of glycerol, mono-cetyl ether of glycerol, di-cetyl ether of glycerol, mono-stearyl ether of glycerol, mono-stearic acid ester of diethylene glycol, monolauric acid ester of ethylene glycol, and the like. The aliphatic polyhydroxy substance which is partially esterified or etherified to provide one of the reacting constituents herein may be selected from a large class and includes, among those mentioned, glycerol; glycols such as ethylene glycol, propylene glycol, trimethylene glycol, butylene glycol and the like; polyglycols such as diethylene glycol; pentaerythritol; quercitol; dihydroxy acetone; polyglycerols such as diglycerol, triglycerol, tetraglycerol and the like including mixtures thereof; carbohydrates and sugars including mono- di- and polysaccharides, such as dextrose, sucrose, xylose, arabinose, galactose, fructose, maltose, mannose, dextrin, starch, and the like; the natural and synthetic, simple and complex glucosides; sugar alcohols such as arabitol, mannitol, sorbitol and dulcitol; and polyhydroxyl-carboxylic acids such as tartaric acid, mucic acid, saccharic acid, gluconic acid, glucuronic acid, gulonic acid, mannonic acid, trihydroxyglutaric acid, glyceric acid, carboxylic oxidation products of polyglycerols, others of similar character, and hydroxyethyl and hydroxypropyl ether derivatives of the above, as, for example:

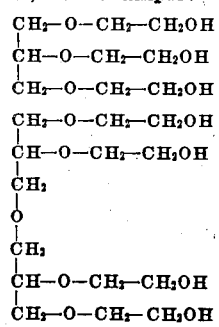

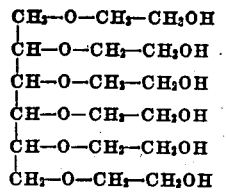

(For convenience, all hydroxyl groups are written facing one way.) In general, this type of alcohol may be represented by the formula $$(RO)_v-A-(OH)_w$$

wherein R is a radical containing at least eight carbon atoms and selected from the group consisting of alkyl, cyclo-alkyl, aryl, aralkyl, and acyl, and substitution products thereof, A is the residue of the aliphatic polyhydroxy substance, and $v$ and $w$ are small whole numbers.

The alcohols may be converted into halides and reacted with alkali metal alcoholates of the alcohol tertiary amines. Or, alternatively, the alcohols may be converted into alkali metal alcoholates and reacted with a halogen derivative of the alcohol tertiary amine.

The compounds of the present invention have utility in various arts in which interface modifying agents are employed. They are particularly resistant to precipitation by calcium and magnesium salts and are especially compatible with acid and alkali media. They may be utilized in washing, laundering and mercerizing baths in the textile and related industries wherein they function for softening, wetting, lathering, detergent, emulsifying, penetrating, dispersing, frothing and foaming purposes. The textiles, various treatments of which in the presence of the agents of the present invention is rendered effective, comprise natural products such as cotton, wool, linen and the like as well as the artificially produced fibres, (and fabrics) such as rayon, cellulose acetates, cellulose ethers and similar artificial silk fabrics. It will be understood, of course, that the agents may be used in aqueous and other media either alone or in combination with other suitable salts of organic or inorganic character or with other interface modifying agents. In the dyeing of textiles many of them may be employed as assistants in order to bring about even level shades. Many of them also may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agriculture purposes. They have utility in the preparation of hair washes and hair shampoos, dentifrices of liquid, cream and powder type, cosmetic creams such as cold creams, vanishing creams, tissue creams, shaving creams of the brushless and lathering type and similar cosmetic preparations. Another use to which many of the agents may be placed is for the treatment of paper where they may be employed, for example, as penetrating agents in the cooking of the paper pulp or the like. Their capillary or interfacial tension reducing properties enables them to be employed in the fruit and vegetable industry in order to effect the removal from fruits and the like of arsenical and similar sprays. They possess utility in the ore dressing industry wherein they function effectively in froth flotation and agglomeration processes. Their interface modifying properties also permit their use in lubricating oils and the like enabling the production of effective boring oils, cutting oils, drilling oils, wire drawing oils, extreme pressure lubricants and the like. They may also be used with effect in the preparation of metal and furniture polishes, shoe polishes, in rubber compositions, for breaking or demulsifying petroleum emulsions such as those of the water-in-oil type which are encountered in oilfield operations, and for various other purposes which will readily occur to those versed in the art in the light of the disclosure herein.

As detergents, they may in general be dissolved in water or aqueous media and utilized in that form or, in the case of solid products, they may be packaged and sold in such form preferably mixed with diluents. They may also be utilized for commercial cleansing, laundering and washing operations with advantage.

The products of the present invention may be employed alone or together with lesser or greater quantities of inorganic or organic compounds. Thus, for example, many of them may be employed together with salts such as sodium chloride, alkali metal phosphates including pyrophosphates and tetraphosphates, sodium sulphate, alums, perborates such as sodium perborate, and the like. They may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophillic gums including pectin, tragacanth, karaya, locust bean, gelatin, arabic and the like, glue, vegetable, animal, fish and mineral oils, solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alkyl sulphates, phosphates, pyrophosphates and tetraphosphates as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivatives such as cetyl sodium sulphonate and lauryl sodium sulphonate; sulphocarboxylic acid esters of higher molecular weight alcohols such as lauryl sodium sulphoacetate, dioctyl sodium sulpho-succinate, dilauryl potassium sulphoglutarate, lauryl monoethanolamine sulpho-acetate, and the like; sulphuric and sulphonic derivatives of condensation products of alkylolamines and higher fatty acids; Turkey-red oils; compounds of the type of isopropyl naphthalene sodium sulphonate, and other classes of wetting agents.

Many of the novel compounds of the present invention can be represented by the general formula

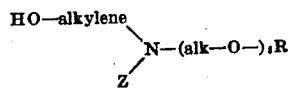

wherein R is an organic hydrocarbon radical, particularly aliphatic or cyclo-aliphatic, Z is alkyl, cycloalkyl, aryl, aralkyl, HO-alk or (alk-O-)$_t$ R, and $t$ is a whole number, preferably 1 or 2. Of particular utility are those compounds where alkylene is ethylene, propylene or butylene, R is alkyl containing from 12 to 18 carbon atoms, $t$ is one, and Z, HO-alk, or (alkylene-O-)$_t$ R.

Others of the compounds of the present invention may be represented by the general formula

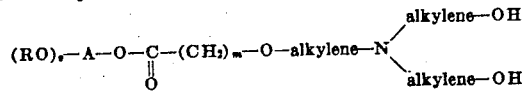

wherein R is a member selected from the group consisting of alkyl and acyl radicals containing at least eight carbon atoms, A is the residue of an aliphatic polyhydroxy substance, and $v$ and $m$ are small whole numbers. Preferably, $v$ is 1 or 2 and $m$ is from 1 to 4.

What we claim as new and desire to protect by Letters Patent of the United States is:

1. An ether of an alcohol tertiary amine in which the hydrogen of at least one hydroxy group is replaced by a radical selected from the group consisting of alkyl and cycloalkyl radicals containing at least eight carbon atoms, there being at least one free hydroxy group present in the alcohol tertiary amine radical.

2. An ether of an alcohol tertiary amine containing at least one hydroxy-ethyl group, hydrogen of a hydroxy group of which is replaced by a radical selected from the group consisting of alkyl and cycloalkyl radicals containing at least eight carbon atoms, there being at least one free hydroxy group present in the alcohol tertiary amine radical.

3. An ether of an ethanol tertiary amine, hydrogen of a hydroxy group of which is replaced by an alkyl radical containing twelve carbon atoms, there being at least one free hydroxy group present in the ethanol tertiary amine radical.

4. Ethers of alcohol tertiary amines in which the hydrogen of only one hydroxy group is replaced by a radical selected from the group consisting of alkyl and cycloalkyl radicals containing at least eight carbon atoms, there being at least one free hydroxy group present in the alcohol tertiary amine radical.

5. Triethanolamine in which the hydrogen of not more than two of the hydroxy groups is replaced by a member selected from the group consisting of alkyl and cycloalkyl radicals containing at least eight carbon atoms.

6. Triethanolamine in which the hydrogen of only one hydroxy group is replaced by an alkyl radical containing from twelve to eighteen carbon atoms.

7. An ether of an alcohol tertiary amine in which the radical which is ether-linked to the alcohol amine is a member selected from the group consisting of alkyl and cycloalkyl radicals and contains an uninterrupted chain of at least eight carbon atoms, said ether containing at least one free hydroxy group in the alcohol amine radical.

MORRIS KATZMAN.
ALBERT K. EPSTEIN.